United States Patent [19]
Okura
[11] Patent Number: 4,858,059
[45] Date of Patent: Aug. 15, 1989

[54] SHORT-CIRCUIT DEVICE OF A GAS-FILLED TRIPLE-POLE DISCHARGE-TUBE TYPE ARRESTER FOR TELEPHONE LINE USE

[76] Inventor: Masahiko Okura, 11-7, 4-Chome, Siroganedai, Minatoku, Tokyo, Japan

[21] Appl. No.: 246,211

[22] Filed: Sep. 19, 1988

[51] Int. Cl.[4] ............ H02H 3/22
[52] U.S. Cl. ............ 361/124; 361/104; 361/118
[58] Field of Search ............ 361/103, 104, 111, 117, 361/118, 119, 120, 124, 126, 127; 337/28, 31, 32

[56] References Cited

U.S. PATENT DOCUMENTS

| | | | |
|---|---|---|---|
| 4,034,326 | 7/1977 | Hill et al. | 361/104 |
| 4,326,231 | 4/1982 | Coren | 337/32 X |
| 4,626,955 | 12/1986 | Cwirzen | 361/124 X |
| 4,642,723 | 2/1987 | Achtnig et al. | 361/124 |

*Primary Examiner*—Derek S. Jennings
*Attorney, Agent, or Firm*—Moonray Kojima

[57] ABSTRACT

Disclosed herein is a short-circuit device of a gas-filled triple-pole discharge-tube type arrester used for telephone lines, wherein a coil-like resilient short-circuit lead is arranged between the lead of an earth electrode and the leads of two line electrodes in an entwined condition through coatings of low temperature-meltable insulator.

1 Claim, 1 Drawing Sheet

SHORT-CIRCUIT DEVICE OF A GAS-FILLED TRIPLE-POLE DISCHARGE-TUBE TYPE ARRESTER FOR TELEPHONE LINE USE

BACKGROUND OF THE INVENTION

This invention relates to an improvement of the short-circuit device used for telephone line arresters.

Heretofore, various short-circuit devices have been disclosed for said like arresters. However, those disclosed ones have frequently been of no use because of such reasons that some of those have too complex construction to make those at low cost and others have too simple construction to keep a stable contact between line leads and an earth lead at the thunderbolt falling time.

SUMMARY OF THE INVENTION

The object of the invention is to provide a short-circuit device used for gas-filled triple-pole discharge-tube type arresters, which has a quite simple construction permitting to manufacture numerous ones at low cost. For this purpose, a short-circuit lead of a resilient coil-like wire is arranged between the lead of the earth electrode and the leads of two line electrodes in a entwined condition through coatings of low temperature-meltable insulator.

DESCRIPTION OF THE PREFERRED EMBODIMENT

Figure 1:
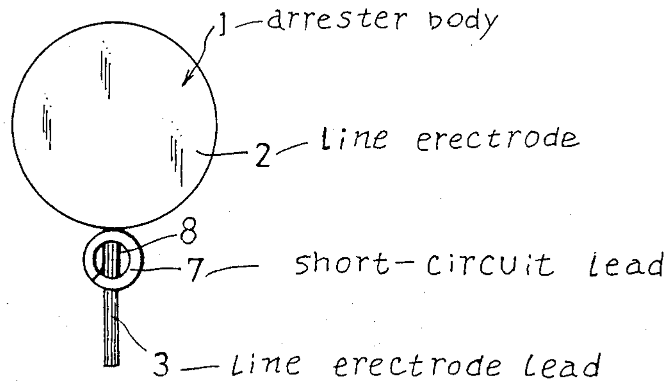
FIG. 1 is a front view of a preferred embodiment of the invention.
Figure 2:
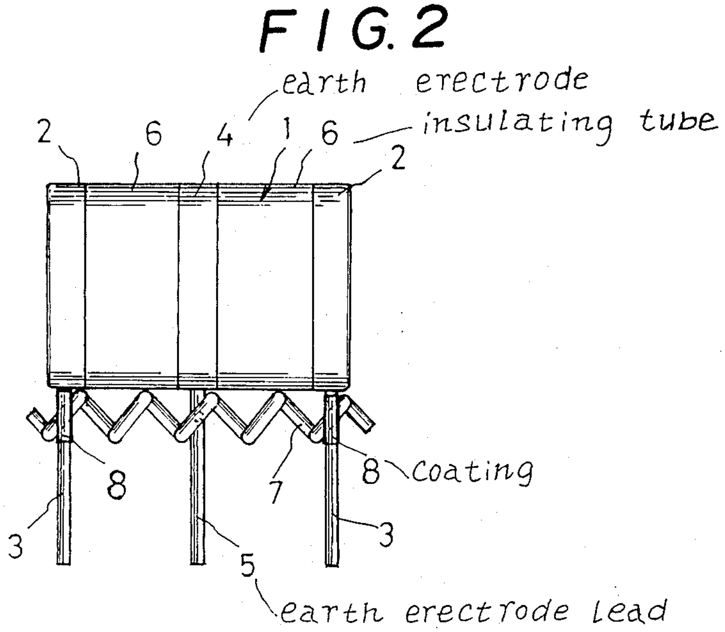
FIG. 2 is an elevation of the same.

In the Figures, 1 is an arrester body. 2, 2 are line electrodes arranged in the right and left end portions of the body 1. 3, 3 are leads elongated downward out of the electrodes 2, 2. 4 is an earth electrode located in the middle of the body 1. 5 is a lead elongated downward out of the electrode 4. 6, 6 are cylindrical insulating tubes being arranged in a pair on the right and left sides of the electrode 4 to be gas-charged by the electrodes 2, 2. As shown in FIG. 2, these leads 3, 3 and 5 are arranged in parallel in the same direction. 7 is an resilient short-circuit lead shaped into a coil-like form, which is spot welded to the lead 5 in the middle thereof and is in a pushing contact with the leads 3, 3 by its own elasticity in an entwined condition. The pushing contact portions of the leads 3, 3 with lead 7 are provided respectively with a coating 8 of a low temperature-meltable insulator. The lead 7 will be selected out of such materials as durable to the high temperature in the lightning discharge and yet as effectible a pushing contact with the leads 3, 3 by its own elasticity. For this purpose, the known "DUMET" wire is adopted as such material in said embodiment.

Inasmuch as the device of the invention has been realized by the quite simple conception that the coil-shaped wire element is used for the short-circuit lead, it is characterized by substantial simplification and cost saving as compared to prior similar devices. Further, the lead 7 will permit to contact with leads 3, 3 in a long contacting portion in this event, short-circuit operation will always be able to effect in a quite stable condition.

I claim:

1. In a gas-filled triple-pole discharge-tube type arrester including an arrester body (1), an earth electrode (4) being arranged in the middle of the body (1) to be sandwiched in between a pair of right and left cylindrical insulating tubes (6), (6) and having a lead (5) elongated downward out of the same, line electrodes (2), (2) arranged in the right and left end portions of the body (1) to gas-charge the insulating tubes (6), (6) and having leads (3), (3) elongated downward out of the same, said leads of the electrodes being arranged in parallel in the same direction to each other, a short-circuit device comprising a resilient short-circuit lead (7) of coil-shaped wire being spot welded to the lead (5) in the middle portion thereof so as for the both end portions thereof to be in a pushing contact with the leads (3), (3) in a entwined condition, said pushing contact portion of the leads (3), (3) being coated with a low temperature meltable insulator (8), (8).

* * * * *